US011577214B2

(12) United States Patent
Jung et al.

(10) Patent No.: US 11,577,214 B2
(45) Date of Patent: Feb. 14, 2023

(54) NANOPARTICLE SYNTHESIS DEVICE AND NANOPARTICLE SYNTHESIS METHOD USING SAME

(71) Applicants: LG CHEM, LTD., Seoul (KR); KNU-INDUSTRY COOPERATION FOUNDATION, Gangwon-do (KR)

(72) Inventors: Jin Mi Jung, Daejeon (KR); Bu Gon Shin, Daejeon (KR); Seong Beom Kim, Gangwon-do (KR); Seok Ho Maeng, Gangwon-do (KR)

(73) Assignees: LG CHEM, LTD., Seoul (KR); KNU-INDUSTRY COOPERATION FOUNDATION, Gangwon-Do (KR)

( * ) Notice: Subject to any disclaimer, the term of this patent is extended or adjusted under 35 U.S.C. 154(b) by 313 days.

(21) Appl. No.: 16/958,622

(22) PCT Filed: Jul. 16, 2019

(86) PCT No.: PCT/KR2019/008775
§ 371 (c)(1),
(2) Date: Jun. 26, 2020

(87) PCT Pub. No.: WO2020/022691
PCT Pub. Date: Jan. 30, 2020

(65) Prior Publication Data
US 2020/0338520 A1    Oct. 29, 2020

(30) Foreign Application Priority Data
Jul. 23, 2018 (KR) .................. 10-2018-0085185

(51) Int. Cl.
*B01J 19/12* (2006.01)
*B01J 19/00* (2006.01)
*C01B 33/029* (2006.01)

(52) U.S. Cl.
CPC .......... *B01J 19/121* (2013.01); *B01J 19/0013* (2013.01); *C01B 33/029* (2013.01); *B01J 2219/0869* (2013.01); *B01J 2219/0871* (2013.01); *B01J 2219/0875* (2013.01); *B01J 2219/12* (2013.01); *C01P 2004/64* (2013.01)

(58) Field of Classification Search
CPC .. B01J 19/121; B01J 19/0013; B01J 2219/12; B01J 2219/0875; B01J 2219/0871; B01J 2219/0869; C01B 33/029; C01P 200/64
See application file for complete search history.

(56) References Cited

U.S. PATENT DOCUMENTS

| 4,843,030 A | 6/1989 | Eden et al. |
| 5,425,922 A * | 6/1995 | Kawaguchi ........... C23C 16/483 |
| | | 422/186 |
| 5,958,348 A * | 9/1999 | Bi .......................... B01J 12/005 |
| | | 977/773 |

(Continued)

FOREIGN PATENT DOCUMENTS

| EP | 1137593 B1 | 5/2000 |
| EP | 2872444 A2 | 5/2015 |

(Continued)

*Primary Examiner* — Lessanework Seifu
(74) *Attorney, Agent, or Firm* — Dentons US LLP

(57) ABSTRACT

The present invention provides a nanoparticle synthesis device capable of improving productivity of nanoparticles by increasing the size of a reaction region of laser pyrolysis of a source gas.

7 Claims, 5 Drawing Sheets

(56) References Cited

U.S. PATENT DOCUMENTS

| | | |
|---|---|---|
| 6,599,631 B2 | 7/2003 | Kambe et al. |
| 10,137,427 B2 | 11/2018 | Cho |
| 2001/0020581 A1 | 9/2001 | Gardner et al. |
| 2004/0229447 A1* | 11/2004 | Swihart ................ C30B 29/605 |
| | | 438/507 |
| 2005/0042152 A1 | 2/2005 | Gardner et al. |
| 2006/0049547 A1 | 3/2006 | Khang |
| 2008/0070801 A1 | 3/2008 | Xiang et al. |
| 2009/0020411 A1 | 1/2009 | Holunga et al. |
| 2010/0059360 A1 | 3/2010 | Wendling |
| 2015/0151976 A1 | 6/2015 | Tenegal |
| 2016/0369405 A1* | 12/2016 | Bent ...................... C23C 18/54 |
| 2017/0189888 A1 | 7/2017 | Cho |

FOREIGN PATENT DOCUMENTS

| | | |
|---|---|---|
| JP | 631445 A | 1/1988 |
| JP | 1988-092727 A | 4/1988 |
| JP | 01242143 A | 9/1989 |
| JP | 1242143 A | 9/1989 |
| JP | 5206515 A | 8/1993 |
| JP | 1999-285868 A | 10/1999 |
| JP | 2012130826 A | 7/2012 |
| KR | 10-2002-0047094 A | 6/2002 |
| KR | 10-2005-0061765 A | 6/2005 |
| KR | 10-0679987 B1 | 2/2007 |
| KR | 10-2009-0018453 A | 2/2009 |
| KR | 10-2015-0036511 A | 7/2015 |
| KR | 10-1547648 B1 | 8/2015 |
| KR | 10-1563144 A | 10/2015 |
| WO | 9709454 A1 | 3/1997 |
| WO | 2014009265 A3 | 1/2014 |

* cited by examiner

[Figure 1]
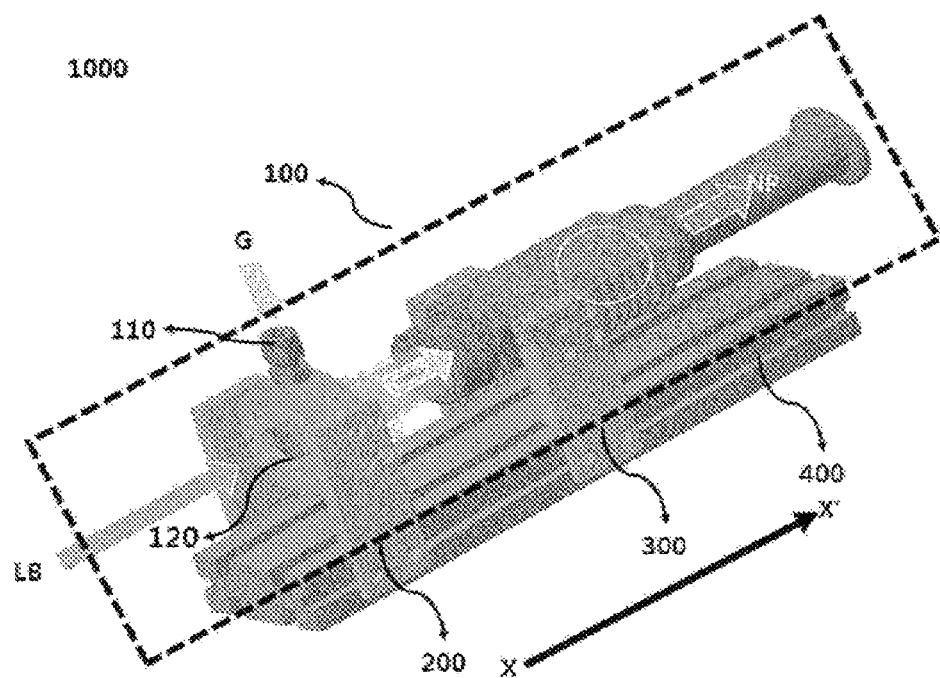
[Figure 2]
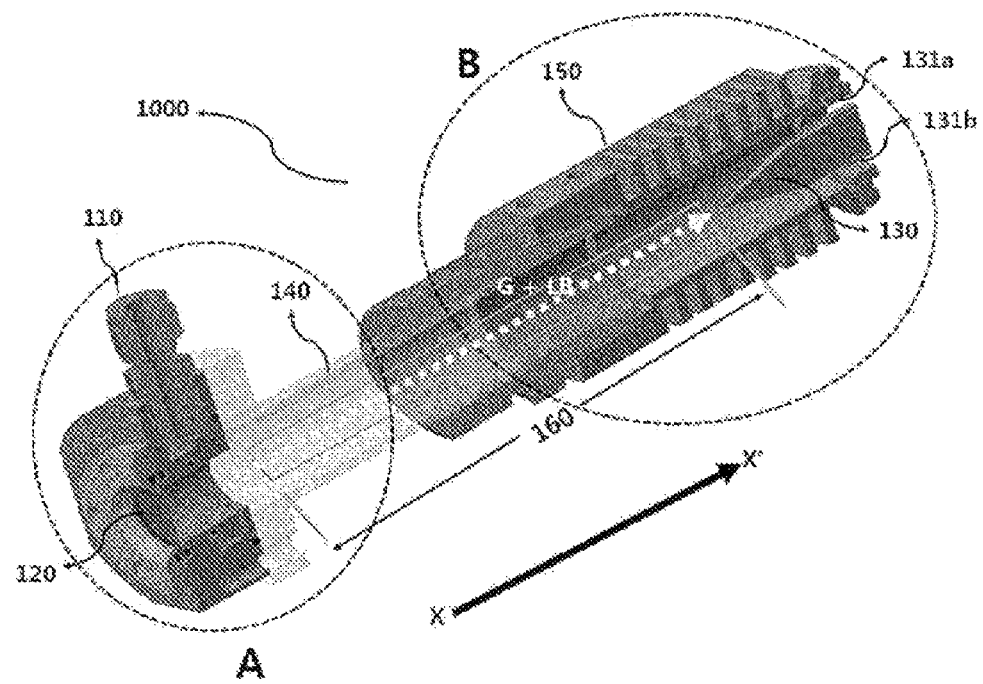

[Figure 3]
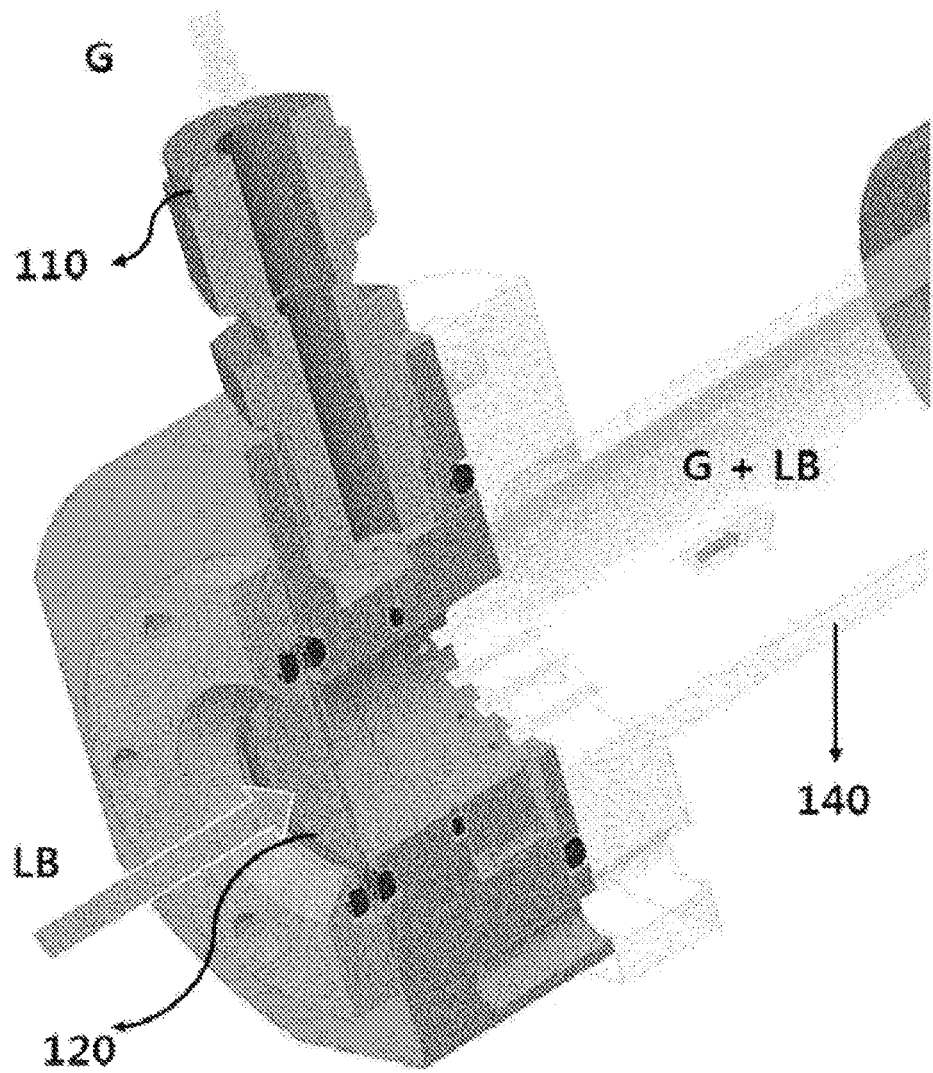

[Figure 4]
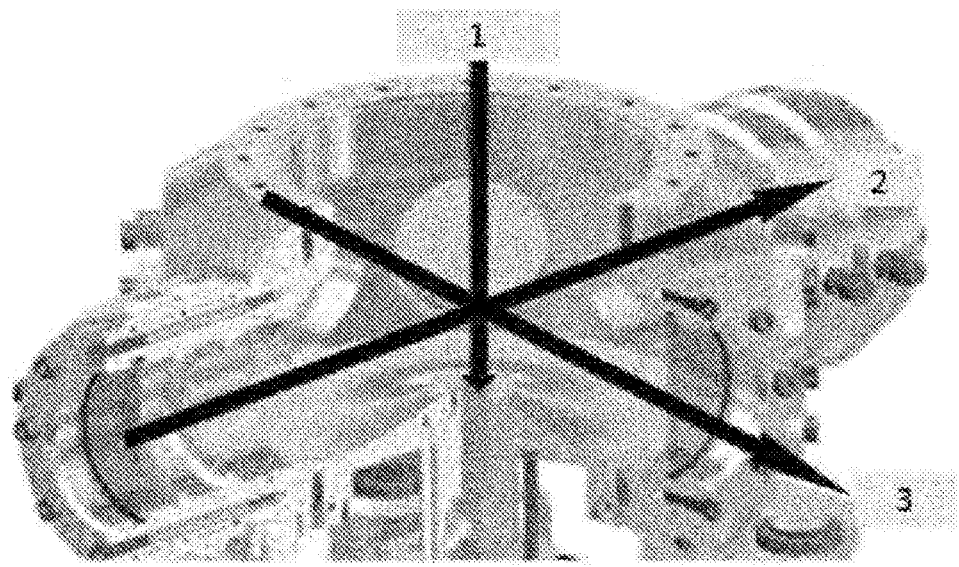
[Figure 5]
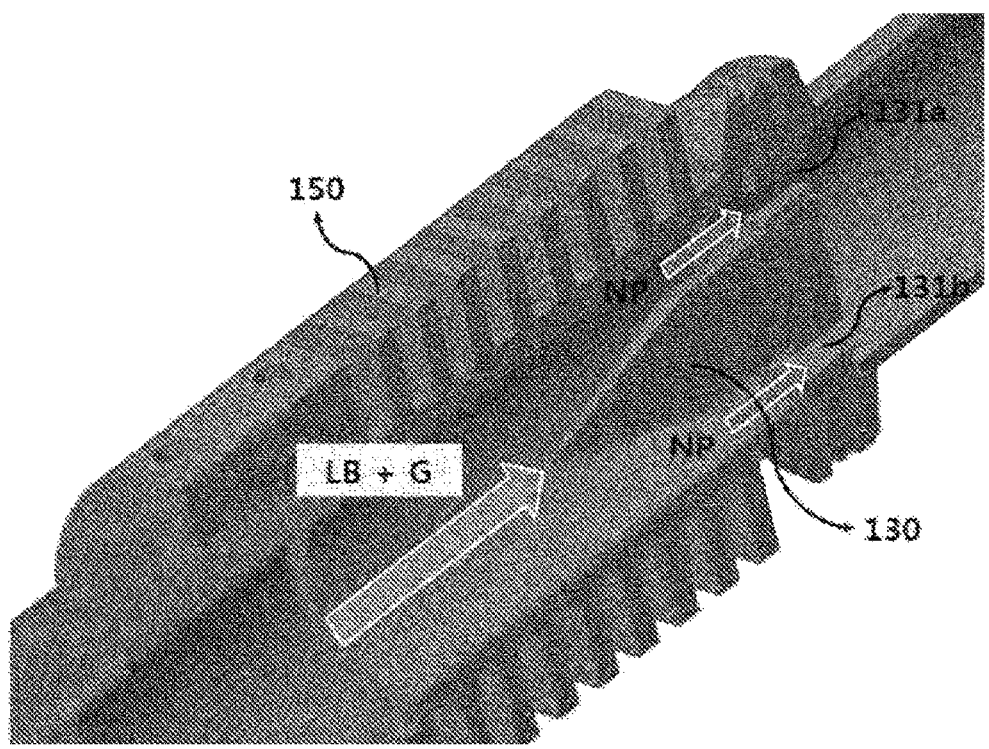

[Figure 6]
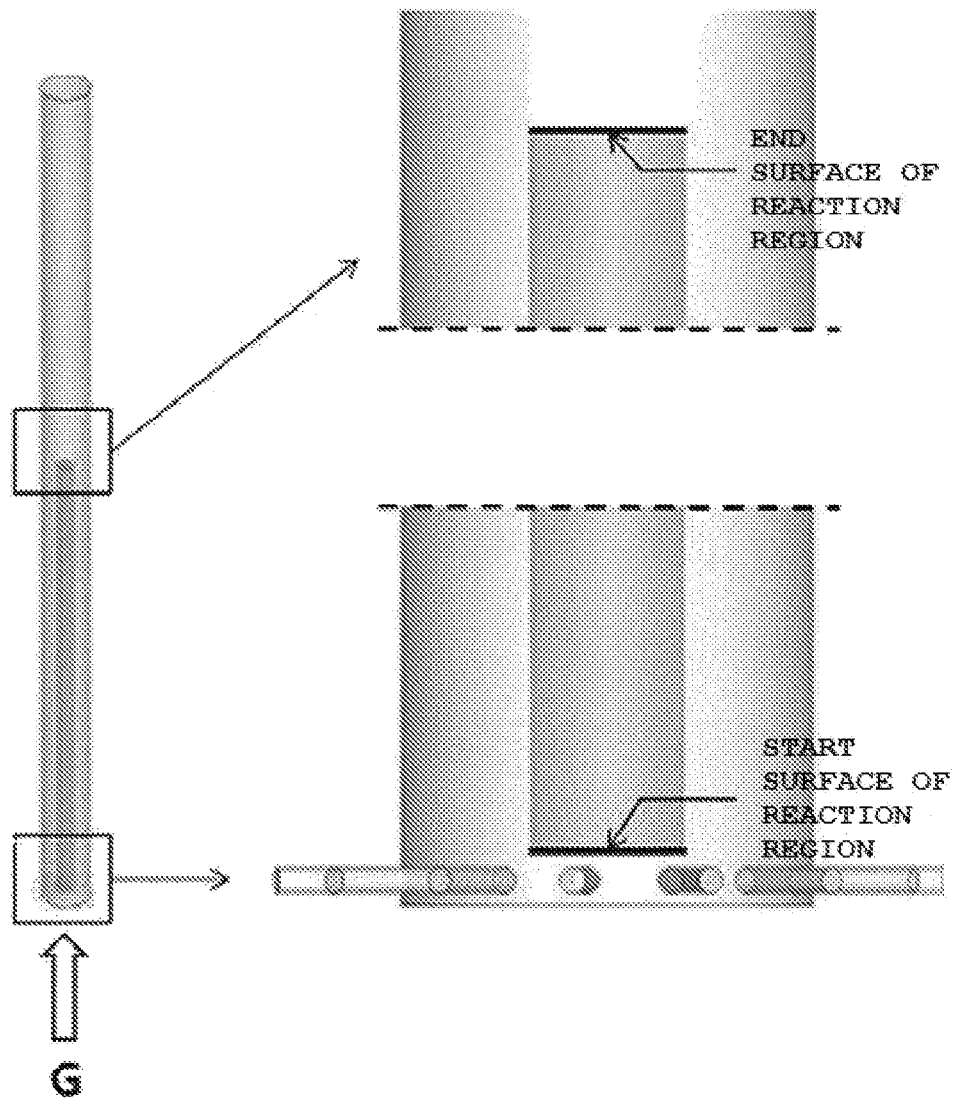

[Figure 7]
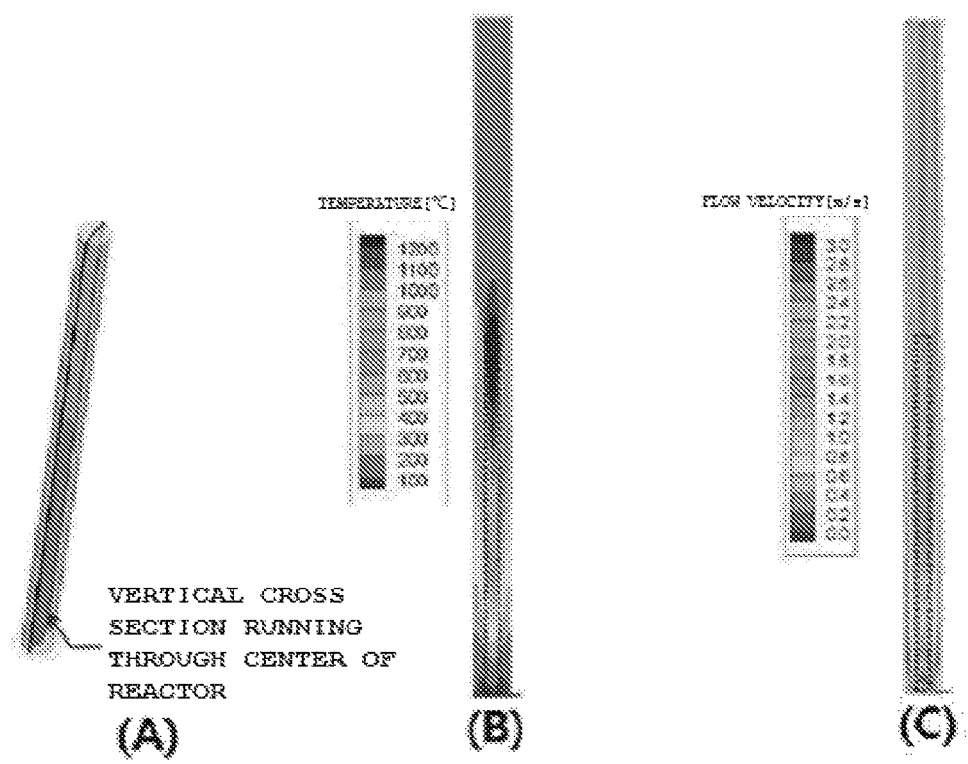

NANOPARTICLE SYNTHESIS DEVICE AND NANOPARTICLE SYNTHESIS METHOD USING SAME

The present application is a National Phase Entry pursuant to 35 U.S.C. § 371 of PCT/KR2019/008775 filed Jul. 16, 2019, and claims priority to and the benefit of Korean Patent Application No. 10-2018-0085185 filed with the Korean Intellectual Property Office on Jul. 23, 2018, the entire contents of which are incorporated herein by reference.

FIELD

The present invention relates to a nanoparticle synthesis device capable of improving productivity of nanoparticles, and a nanoparticle synthesis method using the same.

BACKGROUND

Laser pyrolysis is a method of synthesizing nanoparticles by decomposing a source gas in a very short reaction time by irradiating the source gas with laser beams. As an example, silicon (Si) nanoparticles may be formed when silane ($SiH_4$) gas is decomposed by being irradiated with carbon dioxide ($CO_2$) laser beams. In the laser pyrolysis, in order to improve productivity, it is particularly important to increase a reaction region in which the nanoparticles are produced.

A general laser pyrolysis reactor is designed such that an incident laser beam and a traveling direction of the supplied source gas intersect each other. Meanwhile, in the reactor designed as described above, only an intersection between the incident laser beam and the source gas is set to the reaction region, which is just a micro-region. In addition, there is a limitation in that a pyrolysis reaction needs to be performed within a short time of several microseconds (ms) so that the nanoparticle having a designed size is produced in the reaction region.

In order to solve such a problem and to improve a production yield of nanoparticles, a method of increasing an output of an incident laser beam, a method of adding, into a source gas, a substance for increasing an absorption rate to a laser beam, and the like have been introduced. However, these methods also have a limitation in that reaction efficiency is not greatly improved, such that a gas-phase photocatalyst is further required, or an output of the laser beam needs to be increased, which causes an increase in process costs.

Accordingly, there is a need for a laser pyrolysis reactor designed to improve a region of a laser pyrolysis reaction of a source gas.

DOCUMENT OF RELATED ART

Patent Document

Korean Patent Application Laid-Open No. 10-2015-0036511

SUMMARY

The present invention has been made in an effort to provide a nanoparticle synthesis device capable of improving productivity of nanoparticles by increasing a laser pyrolysis region of a source gas, and a nanoparticle synthesis method using the same.

However, technical problems to be solved by the present invention are not limited to the above-mentioned technical problems, and other technical problems, which are not mentioned above, may be clearly understood by those skilled in the art from the following descriptions.

An exemplary embodiment of the present invention provides a nanoparticle synthesis device including: a reaction chamber; a source gas injection unit provided at one side of the reaction chamber and configured to supply a source gas into the reaction chamber; a laser beam incident unit provided at the other side of the reaction chamber and configured to allow laser beams to be incident on the source gas injected into the reaction chamber; and a laser beam collision unit provided at a side opposite to the side at which the laser beams are incident in the reaction chamber and configured to allow the laser beams from the laser beam incident unit to collide, in which the source gas flows in the reaction chamber in the direction in which the laser beams are incident.

Another exemplary embodiment of the present invention provides a nanoparticle synthesis method using the nanoparticle synthesis device, the method including: supplying a source gas into the reaction chamber; irradiating the supplied source gas with laser beams; and growing nanoparticles by inducing a pyrolysis reaction of the source gas by the incident laser beams, in which the source gas flows in the reaction chamber in the direction in which the laser beams are incident.

The nanoparticle synthesis device according to the exemplary embodiment of the present invention may increase the size of a reaction region in which the flowing source gas and the incident laser beams overlap each other, thereby uniformly performing the pyrolysis reaction of the source gas.

The nanoparticle synthesis device according to the exemplary embodiment of the present invention may have an advantage of mass-producing nanoparticles without increasing outputs of the incident laser beams.

The nanoparticle synthesis device according to the exemplary embodiment of the present invention may mass-produce the nanoparticles even though the source gas has low absorbency in respect to the incident laser beams.

The nanoparticle synthesis device according to the exemplary embodiment of the present invention may easily produce the nanoparticles without adjusting focal points of the incident laser beams.

BRIEF DESCRIPTION OF THE DRAWINGS

FIG. 1 is a perspective view of a nanoparticle synthesis device according to an exemplary embodiment of the present invention.

FIG. 2 is a view illustrating a lateral cut surface of the nanoparticle synthesis device according to the exemplary embodiment of the present invention.

FIG. 3 is an enlarged view of region A in FIG. 2.

FIG. 4 is a schematic view illustrating a nanoparticle synthesis device in the related art.

FIG. 5 is an enlarged view of region B in FIG. 2.

FIG. 6 is a view illustrating a model of a reaction chamber set to perform a computational fluid dynamics (CFD) analysis according to the exemplary embodiment of the present invention.

FIGS. 7A-7C illustrate a result of the computational fluid dynamics (CFD) analysis according to the exemplary embodiment of the present invention.

EXPLANATION OF REFERENCE NUMERALS AND SYMBOLS

100: Reaction chamber
110: Source gas injection unit
120: Laser beam incident unit
130: Laser beam collision unit
131a, 131b: Separation space
140: Visible member
150: Cooling fin
160: Reaction region
200: First fixing member
300: Second fixing member
400: Support member
1000: Nanoparticle synthesis device
LB: Laser beam
G: Source gas
NP: Nanoparticle

DETAILED DESCRIPTION

The present invention will be apparent with reference to exemplary embodiments to be described below in detail together with the accompanying drawings. However, the present invention is not limited to the exemplary embodiments disclosed herein but will be implemented in different and various forms. The exemplary embodiments of the present invention are provided to completely disclose the present invention and to teach the scope of the present invention to a person with ordinary skill in the art. The present invention will be defined only by the scope of the appended claims. Meanwhile, the terms used in the description of the present invention are for explaining the exemplary embodiments, not for restricting and limiting the present invention.

In the present specification, when one member is disposed "on" another member, this includes not only a case where the one member is brought into contact with another member, but also a case where another member is present between the two members.

The terms such as "comprises (includes)" and/or "comprising (including)" used in the specification do not exclude presence or addition of one or more other constituent elements, steps, operations, and/or members, in addition to the mentioned constituent elements, operations, and/or members. Furthermore, the terms such as "first," "second," and other numerical terms may be used herein only to describe various constituent elements, but these constituent elements should not be limited by these terms. These terms are used only to distinguish one constituent element from another constituent element.

Hereinafter, the present invention will be described in detail with reference to the accompanying drawings.

An exemplary embodiment of the present invention provides a nanoparticle synthesis device including: a reaction chamber; a source gas injection unit provided at one side of the reaction chamber and configured to supply a source gas into the reaction chamber; a laser beam incident unit provided at the other side of the reaction chamber and configured to allow laser beams to be incident on the source gas injected into the reaction chamber; and a laser beam collision unit provided at a side opposite to the side at which the laser beams are incident in the reaction chamber and configured to allow the laser beams incident on the laser beam incident unit to collide, in which the source gas flows in a direction in which the laser beams are incident in the reaction chamber.

FIG. 1 is a perspective view of a nanoparticle synthesis device according to an exemplary embodiment of the present invention. Specifically, FIG. 1 is a view illustrating a nanoparticle synthesis device 1000 including a reaction chamber 100, a source gas injection unit 110 provided at one side of the reaction chamber 100 and configured to allow a source gas G to be injected into the reaction chamber 100, and a laser beam incident unit 120 provided at the other side of the reaction chamber 100 and configured to allow laser beams LB to be incident into the reaction chamber 100.

The reaction chamber 100 is a structure in which a pyrolysis reaction of the source gas G is generated and nanoparticles NP produced thereby are captured. Specifically, in the reaction chamber 100, a reactant gas included in the source gas G is decomposed by the laser beams LB. In addition, the decomposed component of the reactant gas grows to become the nanoparticles NP, and the nanoparticles NP may be captured by a nanoparticle capturing unit. The capturing unit may be provided at the other side of the reaction chamber 100, and a general configuration used in the related art may be adopted and used without limitation as long as the capturing unit may capture the nanoparticles NP produced by the pyrolysis reaction of the source gas.

FIG. 2 is a view illustrating a lateral cut surface of the nanoparticle synthesis device according to the exemplary embodiment of the present invention. Specifically, FIG. 2 is a view illustrating a lateral cut surface (X-X') of the nanoparticle synthesis device illustrated in FIG. 1. Referring to FIG. 2, the nanoparticle synthesis device 1000 includes a laser beam collision unit 130 provided in the reaction chamber 100 and provided at the side opposite to the laser beam incident unit 120.

The source gas injection unit 110 allows the source gas G to be injected into the reaction chamber 100 from a supply source for the source gas G. In addition, the source gas injection unit 110 may be a nozzle generally known in the art. Further, multiple source gas injection units 110 may be provided at one side of the reaction chamber 100. In addition, the source gas injection units 110 may be continuously provided at one side of the reaction chamber 100.

The laser beam incident unit 120 allows the laser beams LB, which are emitted from publicly known laser beam emitting equipment, to be incident into the reaction chamber 100. In addition, the laser beam incident unit 120 may further include an optical lens through which the incident laser beams LB may be transmitted. Further, a substance having low absorbency with respect to $CO_2$ continuous-wave laser beams such as ZnSe laser beams may be used as a material of the optical lens.

The laser beams LB travel to the laser beam collision unit 130. Specifically, the laser beams LB incident through the laser beam incident unit 120 collide with the laser beam collision unit 130. Therefore, the entire or a part of thermal energy of the laser beams LB may be absorbed into the laser beam collision unit 130. Alternatively, the entire or a part of the thermal energy of the laser beams LB may be reflected by the laser beam collision unit 130.

In addition, referring to FIG. 2, the source gas G flows in the reaction chamber 100 in a direction in which the laser beams LB are incident. Specifically, the flow direction of the source gas G in the reaction chamber 100 may be in parallel with the direction in which the laser beams LB are incident. More specifically, the flow direction of the source gas G in the reaction chamber 100 may be identical to the direction in which the laser beams LB are incident (G+LB).

When the laser beams LB are incident on the source gas G, the pyrolysis reaction of the source gas G is generated by the laser beams LB. Therefore, a region in which the source gas G and the laser beams LB overlap each other may be a reaction region 160 of the pyrolysis reaction of the source gas G. Specifically, a region between the laser beam collision unit 130 and a portion where the source gas G and the laser beams LB begin to overlap each other in the reaction chamber 100 may be the reaction region 160.

As described above, a nanoparticle synthesis device in the related art is designed such that the flow direction of the source gas and the laser beams incident direction intersect each other. In this case, the contact time between the source gas and the laser beams is inevitably short. In addition, because the nanoparticle synthesis device in the related art has a small region (reaction region) in which the source gas and the laser beams overlap each other, there is a limitation in mass production of the nanoparticles.

In contrast, in the nanoparticle synthesis device according to the exemplary embodiment of the present invention, the source gas G flows in the direction in which the laser beams LB are incident. Therefore, the nanoparticle synthesis device may have an increased reaction region 160. Specifically, in the case in which the source gas G flows in the direction in which the laser beams LB are incident, the contact time between the source gas G and the laser beams LB may be increased. Therefore, the nanoparticle synthesis device may ensure the reaction region 160 having an increased size. Because the size of the reaction region 160 is increased, it is possible to mass-produce the nanoparticles.

FIG. 3 is an enlarged view of region A in FIG. 2. Specifically, FIG. 3 is an enlarged view of region A in FIG. 2, in which a lateral cut surface (X-X') of the nanoparticle synthesis device is illustrated. More specifically, FIG. 3 is an enlarged view of a part corresponding to the source gas injection unit 110 and the laser beam incident unit 120 in the lateral cut surface (X-X') of the nanoparticle synthesis device. FIG. 3 illustrates a state in which the source gas G supplied through the source gas injection unit 110 flows in the direction in which the laser beams LB are incident.

At least one part of the reaction chamber 100 of the nanoparticle synthesis device may be configured such that the pyrolysis reaction of the source gas G caused by the laser beams LB may be observed from the outside. Specifically, the pyrolysis reaction of the source gas G caused by the laser beams LB may be observed through a visible member 140 provided on at least one part of the reaction chamber 100. In addition, the visible member 140 may be made of a publicly known transparent material. As an example, the visible member 140 may be a quartz tube. Further, a size of the visible member 140 is not particularly limited.

Specifically, the size of the reaction region 160 may be adjusted depending on a length of the visible member 140. Specifically, the visible member 140 may be provided on at least one part of the reaction chamber 100, the reaction region 160 is the region in which the source gas G and the laser beams LB overlap each other in the reaction chamber 100, such that the size of the reaction region 160 may be increased as the length of the visible member 140 is increased. Therefore, the nanoparticles may be mass-produced because the size of the reaction region 160 is increased as the length of the visible member 140 is increased.

FIG. 4 is a view schematically illustrating the nanoparticle synthesis device in the related art. Referring to FIG. 4, the nanoparticle synthesis device in the related art is designed such that an incident direction 1 of the laser beams and a flow direction 2 of the source gas intersect each other. In addition, in order to observe the pyrolysis reaction of the source gas, the nanoparticle synthesis device in the related art further includes a separate visible member provided in a direction 3 that intersects the incident direction 1 of the laser beams and the flow direction 2 of the source gas. Meanwhile, in the case of the above-mentioned design, the pyrolysis reaction of the source gas caused by the laser beams is not generated inside the visible member. Therefore, there is a problem in that a large amount of costs is unnecessarily required to design the nanoparticle synthesis device in the related art.

Meanwhile, in the nanoparticle synthesis device according to the exemplary embodiment of the present invention, the visible member 140 may be provided in the direction in parallel with the direction in which the laser beams LB are incident. Further, the pyrolysis reaction of the source gas G caused by the laser beams LB may be generated inside the visible member 140. In addition, in the nanoparticle synthesis device, the direction in which the visible member 140 is provided may be in parallel with the direction in which the laser beams LB are incident. Specifically, the direction in which the visible member 140 is provided may be coincident with the direction in which the laser beams LB are incident. Therefore, in the nanoparticle synthesis device, the part through which the pyrolysis reaction of the source gas G may be observed may coincide with the reaction region 160 in which the reaction is generated. Therefore, the nanoparticle synthesis device has an advantage of solving the problem in that costs required to design the synthesis device are increased because the visible member is provided to just observe the pyrolysis reaction of the source gas G. In addition, in the case in which the nanoparticle synthesis device is used, an operator may directly observe the region in which the pyrolysis reaction of the source gas G is generated. Therefore, the operator may appropriately adjust a condition for supplying the source gas G and a condition for emitting the laser beams LB in accordance with a degree to which the reaction proceeds.

FIG. 5 is an enlarged view of region B in FIG. 2. Specifically, FIG. 5 is an enlarged view of region B in FIG. 2, in which the lateral cut surface (X-X') of the nanoparticle synthesis device is illustrated. FIG. 5 is an enlarged view of a part corresponding to the laser beam collision unit 130 and the cooling fin 150 in the lateral cut surface (X-X') of the nanoparticle synthesis device. More specifically, FIG. 5 is a view illustrating a state in which the nanoparticles NP produced in the reaction region 160 pass through the laser beam collision unit 130 and flow to separation spaces 131a and 131b.

In addition, referring to FIG. 5, the laser beam collision unit 130 may include a body portion, and a blade portion having a cross-sectional area that decreases in a direction from the body portion to the laser beam incident unit. Therefore, the incident laser beams LB may be more efficiently absorbed into, or reflected by, the laser beam collision unit 130. In addition, an end of the blade portion may be pointy or rounded. A material of the laser beam collision unit 130 may be a ductile material such as graphite or a rigid material such as stainless steel or iron. Meanwhile, in order to ensure stability of a process of assembling the nanoparticle synthesis device, a rigid material may be used as the material of the laser beam collision unit 130.

A coating layer capable of absorbing or reflecting the incident laser beams LB may be provided on at least a part of a surface of the laser beam collision unit 130. A material for forming the coating layer is not limited and may be freely selected from publicly known light absorbing or light reflecting substances. In addition, a method of forming the coating layer is not limited, and the coating layer may be formed by using a publicly known method of applying and curing a coating layer forming composition.

Referring to FIG. 5, an outer circumferential surface of the laser beam collision unit 130 and an inner circumferential surface of the reaction chamber 100 are spaced apart from each other, such that the separation spaces 131a and 131b may be formed between the laser beam collision unit 130 and the reaction chamber 100. Specifically, the laser beam collision unit 130 may be fixed to the inner circumferential surface of the reaction chamber 100 by at least one separate fixing member (not illustrated), and the remaining regions, except for the fixing member, may be the separation spaces 131a and 131b. In addition, the nanoparticles NP produced by the pyrolysis reaction of the source gas G may be moved to the nanoparticle capturing unit through the separation spaces 131a and 131b. Specifically, the nanoparticles NP produced by the pyrolysis reaction may be moved to the nanoparticle capturing unit in the reaction chamber 100 through the separation spaces 131a and 131b. The produced nanoparticles NP may be captured by the nanoparticle capturing unit in a vacuum atmosphere.

Multiple cooling fins 150 may be provided on at least a part of an outer circumferential surface of the reaction chamber 100. Therefore, thermal energy of the incident laser beams LB may be discharged from the reaction chamber 100. Specifically, in the case in which the incident laser beams LB are reflected by the laser beam collision unit 130, thermal energy of the reflected laser beams LB may be transferred to the cooling fin 150. In addition, in the case in which the incident laser beams LB are absorbed by the laser beam collision unit 130, the absorbed thermal energy may be transferred to the fixing member for fixing the laser beam collision unit 130 and the reaction chamber 100, transferred from the fixing member to the inner circumferential surface of the reaction chamber 100, and transferred from the inner circumferential surface of the reaction chamber 100 to the cooling fins 150. Therefore, the thermal energy transferred to the cooling fins 150 may be discharged to the outside of the reaction chamber 100, and thus the reaction chamber 100 may be cooled, such that it is possible to prevent a rapid increase in temperature caused by the laser beams LB in the reaction chamber 100 and by reaction heat of the thermal pyrolysis of the source gas G.

The reaction chamber 100 may be fixed on a support member 400 by a first fixing member 200 and a second fixing member 300. Specifically, a region of the reaction chamber 100, which corresponds to the source gas injection unit 110 and the laser beam incident unit 120, may be fixed to the support member 400 by the first fixing member 200. In addition, a region of the reaction chamber 100, which includes the laser beam collision unit 130, may be fixed to the support member 400 by the second fixing member 300. In addition, since the size of the reaction chamber 100 may be adjusted in accordance with the length of the visible member 140, a spacing distance between the first fixing member 200 and the second fixing member 300 may be adjusted in accordance with the length of the visible member 140.

Another exemplary embodiment of the present invention provides a nanoparticle synthesis method using the nanoparticle synthesis device.

Specifically, another exemplary embodiment of the present invention provides a nanoparticle synthesis method using the nanoparticle synthesis device, the method including: supplying a source gas into the reaction chamber; irradiating the supplied source gas with laser beams; and growing nanoparticles by inducing a pyrolysis reaction of the source gas by the incident laser beams, in which the source gas flows in the reaction chamber in the direction in which the laser beams are incident.

As described above, since the source gas flows in the reaction chamber in the direction in which the laser beams are incident, a size of the reaction region in which the pyrolysis reaction of the source gas caused by the laser beams is generated is increased. Therefore, the method may increase productivity of the nanoparticles.

The source gas may be supplied into the reaction chamber by using a publicly known means such as a nozzle. In addition, the operator may appropriately adjust a condition for supplying the source gas so that the source gas flows in the reaction chamber in the direction in which the laser beams are incident.

The source gas may include a reactant gas and a carrier gas. The reactant gas may be a gas involved in the pyrolysis reaction caused by the laser beams. In addition, the reactant gas may include inorganic nanoparticles such as silane ($SiH_4$), specifically, a compound, that is, a raw material of the silicon nanoparticles. In addition, a liquid-phase raw material may be vaporized by using a vaporizer, and the vaporized source gas may be provided to the reaction chamber. For example, liquid-phase $SiCl_4$ may be vaporized by the vaporizer and then supplied into the reaction chamber.

Further, the type of carrier gas is not limited, and the carrier gas may be freely selected from publicly known carrier gases as long as the source gas may flow in the direction in which the laser beams are incident. The laser beams may be emitted from a publicly known laser beam emitting device, and the laser beams incident from the laser beam emitting device may be incident into the reaction chamber through the laser beam incident unit.

The laser beam may be a $CO_2$ continuous-wave (CW) laser beam. That is, the nanoparticle synthesis method may synthesize the nanoparticles through the pyrolysis reaction caused by the $CO_2$ continuous-wave laser beams instead of laser ablation known in the related art. A wavelength of the laser beam may be 9 μm to 11 μm. That is, the pyrolysis reaction of the source gas may be performed by emitting laser beams having relatively long wavelengths or may not be performed by emitting high-output laser beams having short wavelengths.

In the case in which the laser beams are incident on the source gas, specifically, the reactant gas, the pyrolysis reaction of the reactant gas caused by the laser beams may be induced. In addition, when the reactant gas is decomposed, the reactant gas nucleates and aggregates to grow into nanoparticles. In addition, the size of the nanoparticle produced thereby may vary depending on components of the source gas and the condition of the emitted laser beams. Accordingly, the operator may appropriately control the condition of the emitted laser beam and the condition of the supplied source gas to produce the nanoparticles each having a desired size.

A three-dimensional computational fluid dynamics (CFD) analysis was performed to understand flows of substances in the nanoparticle synthesis device according to the exemplary embodiment of the present invention.

FIG. 6 is a view illustrating a model of a reaction chamber set to perform a computational fluid dynamics (CFD) analysis according to the exemplary embodiment of the present invention. As illustrated in FIG. 6, the CFD analysis was performed assuming a condition in which silicon particles would be formed by inputting, to a start surface of the reaction region, $SiCl_4$ as a source gas for synthesizing the nanoparticles, $N_2$ as a carrier gas for carrying $SiCl_4$, and $SF_6$ as an auxiliary gas for absorbing laser beams. In this case, it was assumed that a flow rate of the inputted $SiCl_4$ was 50 cm$^3$/min, a flow rate of the inputted $N_2$ was 4,250 cm$^3$/min, a flow rate of the inputted $SF_6$ was 200 cm$^3$/min, and an internal pressure of the reactor was 200 Torr.

In the case of the synthetic reaction of the nanoparticles, Si radicals formed from the source gas, $SiCl_4$, were bonded to each other and grown to become silicon nanoparticles. In this case, the $SF_6$ gas absorbs laser energy and thus has increased kinetic energy, and the $SF_6$ gas serves as a gas for transferring energy to $SiCl_4$ while colliding with $SiCl_4$, but the $SF_6$ gas is not directly involved in the pyrolysis reaction.

In this case, a heat source was applied to a region in which the source gas and the laser beams matched, and the condition was set in consideration of an increase in temperature of gas caused by the absorption of energy of the laser beams. Specifically, the heat source condition was set to the energy of the laser beams absorbed by $SF_6$ and set in consideration of the situation in which it was considered that when the laser beams are emitted, the $SF_6$ gas absorbs energy, and the absorbed energy serves as a heat source to contribute to the pyrolysis reaction of the $SiCl_4$ gas and to the increase in temperature of the gas. That is, the amount of heat of about 20 W was set to the heat source condition by calculating 'Amount of Heat=Mass X Specific Heat X Change in Temperature (change in temperature from a start temperature to a temperature at which the $SiCl_4$ begins to be decomposed and grown).

FIGS. 7A-7C illustrate a result of the computational fluid dynamics (CFD) analysis according to the exemplary embodiment of the present invention. Specifically, FIG. 7A illustrates a model of the reaction chamber set to perform the CFD analysis, FIG. 7B illustrates a result of analyzing a temperature of the gas in the reaction chamber through the CFD, and FIG. 7C illustrates a result of analyzing a flow velocity of the gas in the reaction chamber through the CFD.

Referring to FIG. 7B, it was ascertained that it was possible to form, in the reaction chamber, a temperature range of 800° C. to 1,200° C. in which the source gas may be decomposed and the silicon particles may be grown within the region in which the source gas and the laser beams matched. In addition, referring to FIG. 7C, it was ascertained that the flow velocity of the source gas being moved in the reaction chamber was relatively increased at the end of the reaction region rather than at the start of the reaction region.

The invention claimed is:

1. A nanoparticle synthesis device comprising:
   a reaction chamber;
   a source gas injection unit provided at one side of the reaction chamber and configured to supply a source gas into the reaction chamber;
   a laser beam incident unit provided at the other side of the reaction chamber and configured to allow laser beams to be incident on the source gas injected into the reaction chamber; and
   a laser beam collision unit provided at a side opposite to the side at which the laser beams are incident in the reaction chamber and configured to allow the laser beams from the laser beam incident unit to collide,
   wherein an outer circumferential surface of the laser beam collision unit and an inner circumferential surface of the reaction chamber are spaced apart from each other such that a separation space is formed therebetween,
   wherein the source gas flows in the reaction chamber in the direction in which the laser beams are incident.

2. The nanoparticle synthesis device of claim 1, wherein at least one part of the reaction chamber enables a pyrolysis reaction of the source gas caused by the laser beams to be observed from outside.

3. The nanoparticle synthesis device of claim 1, wherein the laser beam collision unit is provided with a coating layer formed on at least a part of a surface thereof configured to absorb or reflect the incident laser beams.

4. The nanoparticle synthesis device of claim 1, wherein multiple cooling fins are provided on an outer circumferential surface of at least a part of the reaction chamber.

5. A nanoparticle synthesis method using the nanoparticle synthesis device according to claim 1, the method comprising:
   supplying a source gas into the reaction chamber;
   irradiating the supplied source gas with laser beams; and
   growing nanoparticles by inducing a pyrolysis reaction of the source gas by the incident laser beams,
   wherein the source gas flows in the reaction chamber in the direction in which the laser beams are incident.

6. The nanoparticle synthesis method of claim 5, wherein the laser beam is a $CO_2$ continuous-wave laser beam.

7. The nanoparticle synthesis method of claim 5, wherein the source gas includes a reactant gas and a carrier gas.

* * * * *